United States Patent [19]

Carson et al.

[11] Patent Number: 5,600,192
[45] Date of Patent: Feb. 4, 1997

[54] DC ELECTRIC MOTOR HAVING A FLUX CONCENTRATING MEMBER THEREON

[75] Inventors: David M. Carson; John A. Fleming, both of Newtown; Victor W. Miranda, Jr., West Haven, all of Conn.

[73] Assignee: Sorvall Products, L.P., Newtown, Conn.

[21] Appl. No.: 283,113

[22] Filed: Jul. 29, 1994

[51] Int. Cl.⁶ .......................... H02K 29/08; H02K 11/00
[52] U.S. Cl. ........................................ 310/68 B; 324/207.2
[58] Field of Search ................................ 310/68 B, 257, 310/254; 324/207.25, 207.02

[56] References Cited

U.S. PATENT DOCUMENTS

| | | | |
|---|---|---|---|
| 2,924,633 | 2/1960 | Sichling et al. | 123/148 |
| 3,189,762 | 6/1965 | Galpin | 307/88.5 |
| 3,194,990 | 7/1965 | Kendall | 310/10 |
| 3,309,642 | 3/1967 | Grancoin | 338/32 |
| 3,483,456 | 12/1969 | Brunner et al. | 318/138 |
| 3,535,626 | 10/1970 | Uemura et al. | 324/46 |
| 3,805,134 | 4/1974 | Osamu et al. | 318/254 |
| 3,845,445 | 10/1974 | Braun et al. | 338/32 H |
| 4,115,715 | 9/1978 | Muller | 310/68 B |
| 4,204,158 | 5/1980 | Ricouard et al. | 324/208 |
| 4,220,879 | 9/1980 | Hoshimi et al. | 310/68 R |
| 4,242,608 | 12/1980 | Ishigaki et al. | 310/68 R |
| 4,339,875 | 7/1982 | Muller | 29/602 |
| 4,365,187 | 12/1982 | McDaniel et al. | 318/254 |
| 4,429,263 | 1/1984 | Muller | 318/254 |
| 4,475,068 | 10/1984 | Brailsford | 318/254 |
| 4,547,714 | 10/1985 | Muller | 318/254 |
| 4,562,399 | 12/1985 | Fisher | 322/94 |
| 4,985,792 | 1/1991 | Moir | 360/99.08 |
| 5,075,605 | 12/1991 | Hendricks et al. | 318/133 |
| 5,146,125 | 9/1992 | Kerlin | 310/68 R |
| 5,194,771 | 3/1993 | Otsuki et al. | 310/68 B |
| 5,418,416 | 5/1995 | Muller, Sr. | 310/68 B |

FOREIGN PATENT DOCUMENTS

| | | |
|---|---|---|
| 455578 | 11/1991 | European Pat. Off. . |
| 484666 | 5/1992 | European Pat. Off. . |
| 2835210 | 2/1980 | Germany . |
| 2560207 | 5/1981 | Germany . |
| 3331754A1 | 9/1983 | Germany . |
| 56-062060 | 5/1981 | Japan . |
| 2474422/ 24-07 | 4/1977 | Russian Federation . |

OTHER PUBLICATIONS

Hanselman, *Brushless Permanent–Magnet Motor Design,* McGraw–Hill Inc. (1994) pp. 106–107.

*Primary Examiner*—Steven L. Stephan
*Assistant Examiner*—Judson H. Jones
*Attorney, Agent, or Firm*— Ohlandt, Greeley, Ruggiero & Perle

[57] ABSTRACT

A support substrate having an array of magnetically responsive sensors is mounted within the housing of a brushless DC motor in a plane perpendicular to the axis of the motor shaft having commutating magnets thereon. A ferromagnetic flux concentrating member in the form of a generally planar disc having an annular rim with radially inwardly directed spokes is mounted to the support substrate. Each spoke has a radial gap therein. A magnetically responsive sensor is received within each radial gap. The gap may divide the spoke into two discrete gap segments, or may alternatively form an enclosed recess with generally radially extending sidebars along each lateral edge of the spoke. The flux concentrating member conducts magnetic flux emanating from one magnetic pole to and through each of the magnetically responsive sensors and returns the flux to the other pole, such that, as the shaft is rotated, each of the magnetically responsive sensors is at substantially all times under the influence of magnetic flux emanating from one of the commutating magnets.

12 Claims, 3 Drawing Sheets

DC ELECTRIC MOTOR HAVING A FLUX CONCENTRATING MEMBER THEREON

BACKGROUND OF THE INVENTION

1. Field of the Invention

The present invention relates to a brushless DC electric motor, and in particular, to a brushless DC electric motor having a flux concentrating member thereon.

2. Description of the Prior Art

A brushless DC electric motor uses an array of magnetically responsive sensors, such as Hall Effect devices, to generate the commutation control signals that switch current among the motor's field windings. The sensors are triggered by the proximal passage of the permanent magnets carried on the rotor.

The Hall Effect device, whether of the latching or non-latching type, requires that a magnetic flux of a sufficient density impinge thereon. Moreover, for most effective operation, the flux must be oriented within some close angular range of perpendicularity with respect to the face of the Hall Effect device. Unless these considerations of sufficient flux density and proper flux orientation are met there is a possibility of erroneous switching of the device.

In view of the foregoing it is believed to be advantageous to provide a flux concentrating arrangement for conducting magnetic flux to and through the magnetic sensors in a brushless DC motor.

SUMMARY OF THE INVENTION

The present invention is directed to a brushless DC electric motor comprising a motor housing having a rotatable shaft extending centrally and axially therethrough. The shaft has an array of commutating magnets thereon, with each magnet having a pole of a first polarity and a pole of and a second polarity. The commutating magnets may be realized as extensions of motor magnets or as separate magnets attached to the shaft. A support substrate is mounted within the housing in a plane perpendicular to the axis of the shaft. The support substrate has a plurality of magnetically responsive sensors disposed thereon, the sensors being arranged in a predetermined pattern about the shaft.

In accordance with this invention a ferromagnetic flux concentrating member is mounted to the support substrate in a predetermined relationship with each of the magnetically responsive sensors. The flux concentrating member conducts magnetic flux emanating from a pole of the first polarity to and through each of the magnetically responsive sensors and returns the flux to a pole of the second polarity, such that, as the shaft is rotated, each of the magnetically responsive sensors is at substantially all times under the influence of magnetic flux emanating from one of the commutating magnets.

In the preferred instance the flux concentrating member takes the form of a generally planar disc having an annular rim with a plurality of radially inwardly directed spokes. The number of spokes corresponds to the number of magnetically responsive sensors. Each spoke has a radial gap therein with each of the magnetically responsive sensors being received within the radial gap in one of the spokes. The gap may be such as to divide the spoke in which it is disposed into two discrete gap segments. Alternatively, the gap in each spoke may be implemented in the form of an enclosed recess, by which a generally radially extending sidebar is along each lateral edge of the spoke. The sidebars are arranged to bridge the radial gap along each lateral edge of each spoke so as to enclose laterally the radial gap in the spoke. Each sidebar is sized so as to be saturated with magnetic flux when a commutating magnet on the shaft lies within a predetermined circumferential angular range of the radial inward end of the spoke.

However the spokes are configured, each spoke may further include a pair of fingers, with each finger being disposed at the radially inward end of a spoke at one circumferential edge thereof. Each of the fingers extends circumferentially from the edge of the spoke in surrounding relationship with respect to a predetermined angular extent of the shaft. The fingers and fire radially inward end of the spoke cooperate to surround a predetermined angular extent of the shaft so that, as the shaft is rotated, each sensors is at substantially all times under the influence of magnetic flux emanating from one of the commutating magnets. In a preferred implementation, if the motor has P poles and N magnetically responsive sensors, the angular extent A of the shaft that is surrounded by the radially inward end of each spoke and the fingers extending therefrom is, in degrees, given by the relationship:

$$A=360/(P \times N).$$

BRIEF DESCRIPTION OF THE DRAWINGS

The present invention will be fully understood from following detailed description thereof, taken in connection with the accompanying drawings, which form a part of this application, and in which.

DETAILED DESCRIPTION OF THE INVENTION

Figure 1:
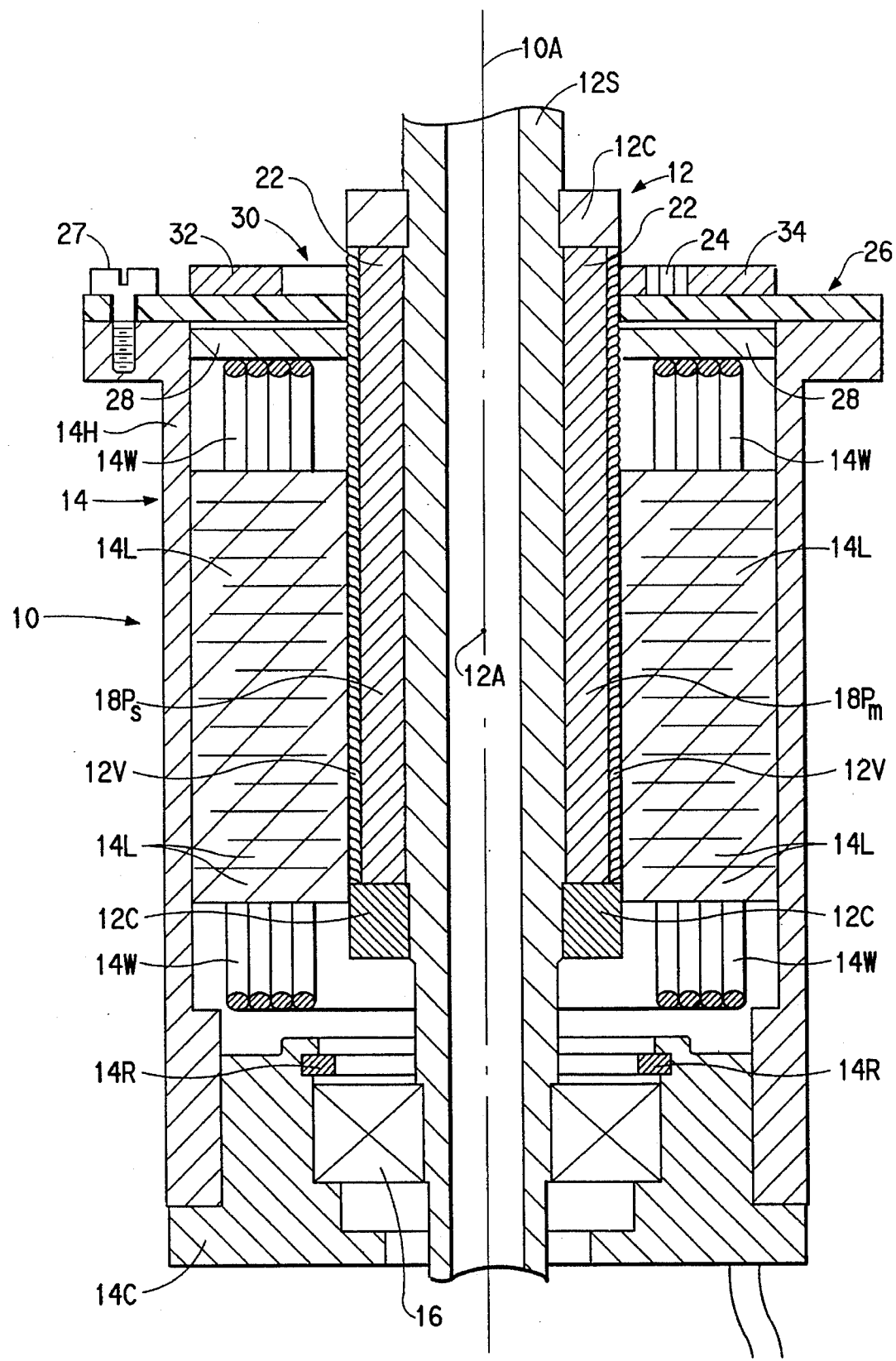
FIG. 1 is a side elevational view, entirely in section, of a portion of a brushless DC electric motor having a magnetic flux concentrating arrangement in accordance with the present invention.

Throughout the following detailed description, similar reference numerals refer to similar elements in all Figures of the drawings.

FIG. 1 shows a brushless DC electric motor generally indicated by the reference character 10 having therein a flux concentrating arrangement 30 in accordance with this present invention. Since the overall structure of the motor 10 is well known to those skilled in the art only a brief overview of the conventional elements thereof is presented.

The motor 10 includes a rotary element, or rotor, 12 and a corresponding stationary element, or stator, 14. The rotor 12 is an elongated member that extends centrally and axially through the stator 14. The rotor 12 is mounted on bearings 16 for relative rotation about the motor axis 10A with respect to the stator 14. Only one bearing 16 is shown in FIG. 1 for clarity of illustration. The rotor 12 includes a shaft 12S that carries an array of permanent magnets. The axis 12A of the shaft 12S aligns collinearly with the axis 10A of the motor 10. The shaft 12S may be solid, or hollow, as illustrated. The magnets are held on the shaft 12S by a sleeve 12V that is captured between a pair of collars 12C.

Each of the permanent magnets is formed from a suitable magnetic material, such as sumerium cobalt. Each magnet has a north pole $18P_n$ and a corresponding south pole $18P_s$ thereon. Typically, there are two to eight magnets disposed on the shaft 12S, thereby defining four to sixteen magnetic poles. It may be desirable in some instances to separate adjacent magnetic poles by spacers (not shown). The spacers are formed of a nonmagnetic material, such as titanium or 300 series stainless steel. The magnets on the shaft 12S respond to rotating magnetic fields that are generated in the stator 14 to cause rotational motion of the rotor 12.

The stator 14 includes a housing 14H that is closed at one end by an end cap 14C. The cap 14C supports the bearing 16, which is held in place by the lock ring 14R. The housing 14H supports a stacked array of ferromagnetic laminates 14L. The individual laminates 14L are vertically registered to define generally axially extending slots in which current carrying conductor windings 14W are wrapped. The end turn portions of the windings 14W project axially beyond the main portion of the structure of the stator. Energization of appropriate ones of the field windings 14W under the control of a commutation control arrangement (not shown) generates appropriate magnetic fields in the stator 14. The fields generated in the stator 14 attract and repel corresponding poles of the permanent magnets carried by the shaft 12S to cause rotation of the rotor 12. As will be developed the projecting end turns of the windings 14W may define an extraneous source of magnetic flux that hampers operation of the commutation control.

Figure 2:
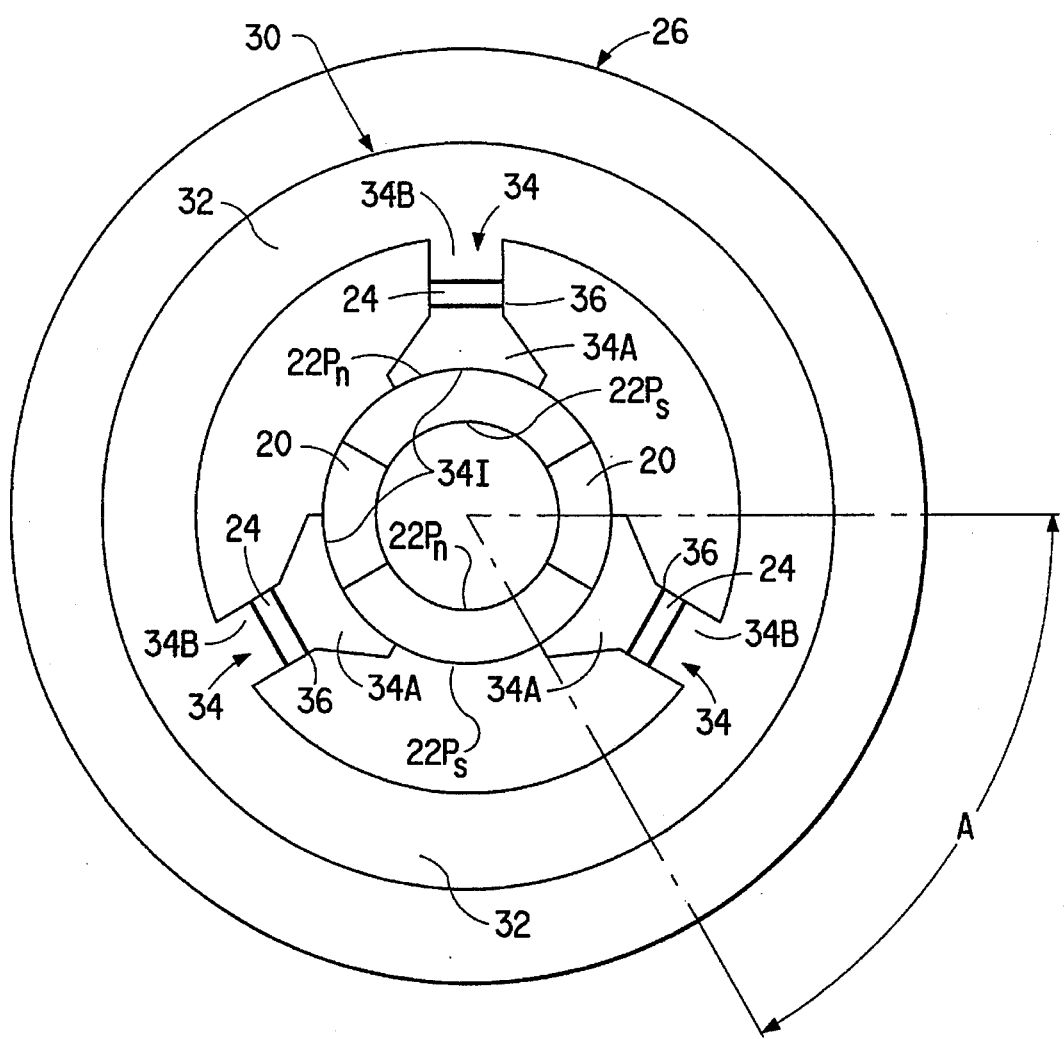
FIG. 2 is an plan view of a first embodiment of the magnetic flux concentrating arrangement in accordance with the present invention.
Figure 3:
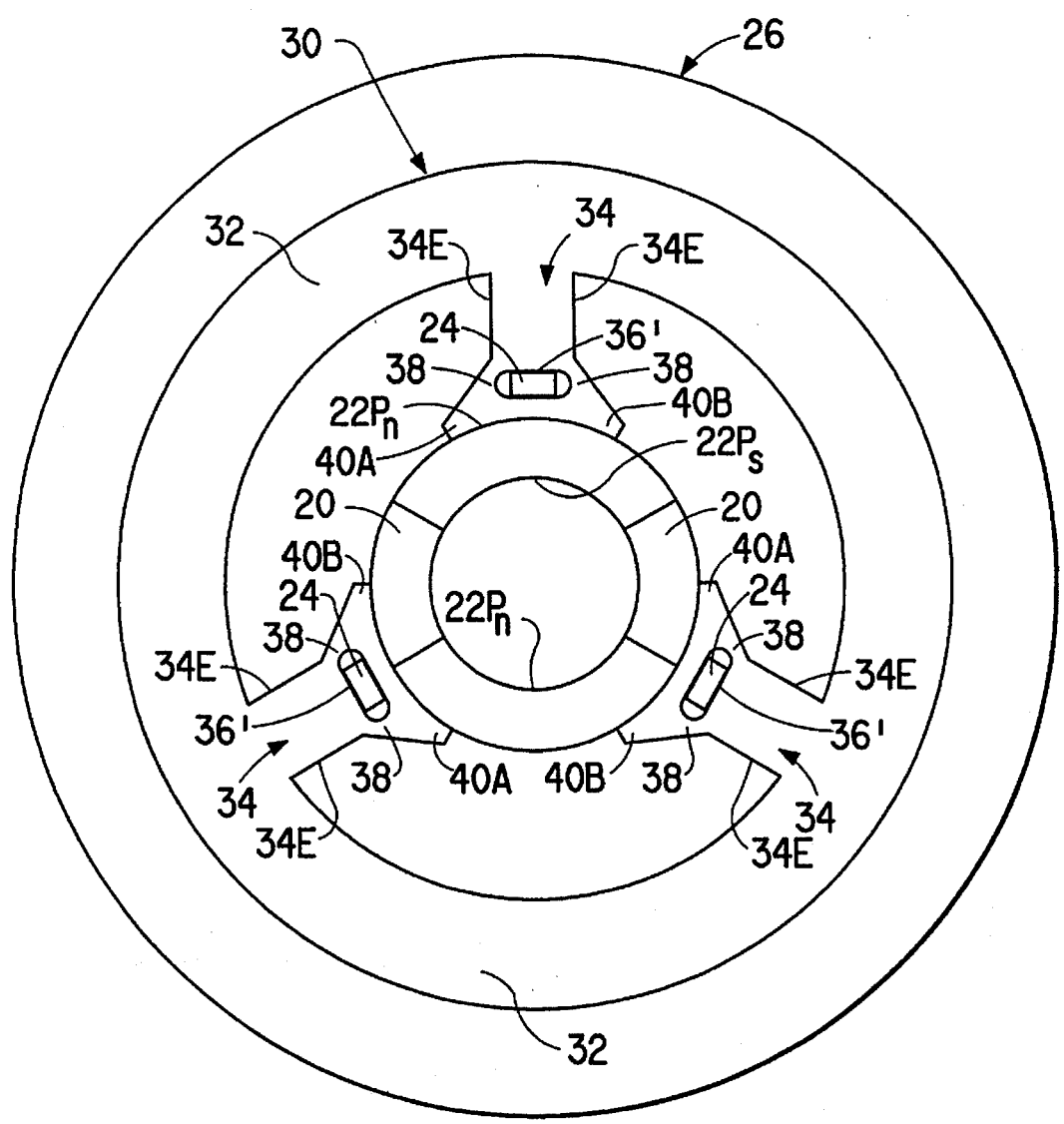
FIG. 3 is an plan view similar to that shown in FIG. 2 illustrating an alternate embodiment of the magnetic flux concentrating arrangement in accordance with the present invention.

The switching of the polarity of the poles of the magnetic fields produced in the stator laminates 14L by the passage of current through the field windings 14W is controlled by a commutation control arrangement. The commutation control arrangement includes a plurality of commutating magnets 22 that are mounted to the shaft 12S and which interact with a plurality of magnetically responsive sensors 24. In some instances the commutating magnets 22 are realized as magnetic elements that are separate from the permanent magnets. Alternatively, as illustrated in the Figures, the commutating magnets 22 may be realized by axial extensions of the permanent magnets. The commutating magnets 22 correspond in number to the number of permanent magnets on the shaft 12S. Each commutating magnet 22 has thereon a north pole $22P_n$ and a corresponding south pole $22P_s$. The commutating magnets 22 may be separated circumferentially by a spacer 20, if desired (FIGS. 2, 3).

The magnetically responsive sensors 24 (FIGS. 2, 3) are supported on a support substrate 26 that is disposed in a plane substantially perpendicular to the axis 12A of the shaft 12S. The substrate 26 is formed from a nonmagnetic material, such as a fiber glass printed circuit board. The substrate 26 is mounted in a fixed relationship with respect to the axis 12A. In the illustrated embodiment the substrate 26 is secured to the stator 14 by axially extending bolts 27 that extend through the substrate 26 into bores provided in the stator 14. The magnetically responsive sensors 24 are preferably implemented by Hall Effect switches, either of the latching or of the nonlatching type. The nonlatching type of sensor is more preferred for use in the environment in which the invention is used, viz., as the motive source for a centrifuge instrument. The sensors 24 are suitable affixed to the substrate, 26, as by soldering, and are arranged in a predetermined pattern circumferentially about the shaft 12S.

As noted, in some instances the switching of current through the field windings 14W of the stator 14 generate magnetic fields that inadvertently trigger the sensors 24. To minimize this effect, in accordance with this invention, the nonmagnetic substrate 26 is spaced axially above the stator 14 such that the end turns of the field windings 14W are spaced from the sensors 24. A disc 28 of magnetic material such a iron or steel is disposed intermediate the lower surface of the substrate 26 and the end turns of the windings 14W. The disc 28 serves to shield the sensors 24 from the effect of extraneous fields.

Also in accordance with this invention, to further minimize the effect of extraneous magnetic flux (whatever its origin), the substrate 26 carries a flux concentrating member 30. As is illustrated in FIGS. 2 and 3 and as will be explained herein the flux concentrating member 30 is supported by the substrate 26 and is arranged in a predetermined relationship with each of the magnetically responsive sensors 24. The flux concentrating member 26 is operative to conduct magnetic flux emanating from a pole of the commutating magnet 22 of the first polarity (i.e., either a north pole $22P_n$ or a south pole $22P_s$), to and through each of the magnetically responsive sensors 24, and to return the flux to a pole of the second polarity (i.e., to either a south pole $22P_s$ or a north pole $22P_n$). As a result, as the shaft 12S is rotated, each of the magnetically responsive sensors 24 is at substantially all times under the influence of magnetic flux emanating from one of the commutating magnets 22.

As seen in both FIG. 2 and FIG. 3, the flux concentrating member 30 is a generally planar disc having an annular rim 32 with a plurality of radially inwardly directed spokes 34. In the preferred instance the member 30 may be conveniently fabricated from a ferromagnetic stator lamination 14L identical to those used to form the stator. The number of spokes 34 corresponds to the number of magnetically responsive sensors 24 on the substrate 26. In accordance with this invention each spoke 34 has a radial gap 36 therein. Each of the magnetically responsive sensors 24 is received within a radial gap 36 in one of the spokes 34. Each spoke 34 has a radially inward end 36I, and a pair of circumferentially spaced (with respect to the axis 12A) lateral edges 34E thereon. Preferably, but not necessarily, the radial gap 36 is disposed in each spoke 34 adjacent to the radially inward end 34I thereof.

In the embodiment shown in FIG. 2 the radial gap 36 divides the spoke 34 in which it is disposed into two discrete segments 34A, 34B. The sensor 24 is mounted in the gap 36 between the radially outer face of the inner segment 36A and the radially inner face of the outer segment 36B. The sensor 24 is oriented such that its planar surfaces are parallel to the proximal faces of the segments.

Alternatively, as shown in FIG. 3, each spoke 34 has a pair of generally radially extending sidebars 38 that bridge the radial gap 36 along each lateral edge 34E of each spoke 34. In this embodiment, the cooperation of the sidebars 38 together with the segments 34A, 34B define a gap 36 in the form of a recess, or pocket 36', in which the sensor 24 is received. Again, the planar surfaces of the sensor 24 are parallel to the proximal faces of the segments. Owing to the presence of the sidebars 38 the sensor 24 is thus totally surrounded by the material of the spoke 34. Each sidebar 38 is sized so as to be saturated with magnetic flux when a commutating magnet 22P on the shaft 12 lies within a predetermined circumferential angular range of the radial inward end 34I of the spoke 34. Since the sidebars 38 are saturated, the majority of magnetic flux is directed through the Hall Effect sensor 24.

However implemented, each spoke 34 has a pair of fingers 40A, 40B thereon. Each finger 40A, 40B is disposed at the radially inward end 34I of a spoke 34 along one respective lateral edge 34E thereof. Each of the fingers 40A, 40B flares circumferentially from the spoke 34 in surrounding relationship with respect to a predetermined angular extent of the shaft 12 and the commutating magnets 22P thereon. The circumferential extent of the radially inward end 34I of each spoke 34, whether or not provided with the circumferentially extending fingers 40A, 40B, is selected such that at substantially all times during the rotation of the shaft 12 each of the sensors 24 is under the influence of magnetic flux emanating from one of the commutating magnets.

For a motor that has P poles and N magnetically responsive sensors 24 the angular extent A (in degrees) to which the shaft 12 is surrounded by the radially inward of the spoke 34 (with or without the fingers 40) may be expressed by the relationship:

$$A=360/(P \times N).$$

Those skilled in the art, having the benefit of the teachings of the present invention may impart numerous modifications thereto. Such modifications are to be construed as lying within the scope of the present invention, as defined by the appended claims.

What is claimed is:

1. A brushless DC electric motor comprising:

a motor housing, the housing having a stator therein, the stator having first and second axial ends thereon, the stator carrying conductive windings having end turn portions that project past each axial end of the stator;

a rotatable shaft extending centrally and axially through the stator, the shaft having an axis extending therethrough, the shaft having an array of commutating magnets thereon, each magnet having a pole of a first polarity and a pole of a second polarity;

a support substrate spaced axially from the first axial end of the stator and mounted in a fixed relationship with respect to the axis of the shaft and in a plane perpendicular thereto, the support substrate having opposed first and second surfaces thereon, the first surface of the support substrate facing toward the end turns projecting past the first axial end of the stator, the support substrate having a plurality of sensors disposed on the second surface thereof, the sensors being susceptible to influence by the magnets, the sensors being arranged in a predetermined pattern about the shaft;

a ferromagnetic flux concentrating member mounted to the second surface of the support substrate in a predetermined relationship with each of the sensors, the flux concentrating member conducting magnetic flux emanating from a pole of the first polarity to and through each of the sensors and returning the flux to a pole of the second polarity, such that, as the shaft is rotated, each of the sensors is at substantially all times susceptible to the influence of magnetic flux emanating from one of the commutating magnets, wherein the flux concentrating member is a generally planar disc having an annular rim with a plurality of radially inwardly directed spokes, the number of spokes corresponding to the number of magnetically responsive sensors, each spoke having a radial gap therein, each one of the sensors being received within the radial gap in one of the spokes.

2. The motor of claim 1 wherein each spoke has a radially inward end, the radial gap in each spoke being disposed adjacent to the radially inward end thereof.

3. The motor of claim 2 wherein each spoke has opposed lateral edges thereon, and wherein each spoke has a pair of generally radially extending sidebars, one of the sidebars bridging the radial gap along each lateral edge of each spoke so as to enclose laterally the radial gap in the spoke, each sidebar being sized so as to be saturated with magnetic flux when a commutating magnet on the shaft lies within a predetermined circumferential angular range of the radial inward end of the spoke, thereby to direct the majority of magnetic flux through the sensor.

4. The motor of claim 1 wherein each spoke has opposed lateral edges thereon, and wherein each spoke has a pair of generally radially extending sidebars, one of the sidebars bridging the radial gap along each lateral edge of each spoke so as to enclose laterally the radial gap in the spoke, each sidebar being sized so as to be saturated with magnetic flux when a commutating magnet on the shaft lies within a predetermined circumferential angular range of the radial inward end of the spoke, thereby to direct the majority of magnetic flux through the sensor.

5. The motor of claim 2 wherein each spoke has opposed lateral edges thereon, and wherein each spoke has a pair of fingers, each finger being disposed at the radially inward end of a spoke at one lateral edge thereof, each of the fingers extending circumferentially from the spoke in surrounding relationship with respect to a predetermined angular extent of the shaft.

6. The motor of claim 1 wherein each spoke has opposed lateral edges thereon, and wherein each spoke has a pair of fingers, each finger being disposed at the radially inward end of a spoke at one circumferential edge thereof, each of the fingers extending circumferentially from the spoke in surrounding relationship with respect to a predetermined angular extent of the shaft.

7. The motor of claim 6 wherein the motor has P poles and wherein there are N magnetically responsive sensors, and wherein the predetermined angular extent of the shaft that is surrounded by the radially inward end of the spoke and the fingers extending therefrom is, in degrees, equal to the number 360 divided by the product of (P×N).

8. The motor of claim 5 wherein the motor has P poles and wherein there are N magnetically responsive sensors, and wherein the predetermined angular extent of the shaft that is surrounded by the radially inward end of the spoke and the fingers extending therefrom is, in degrees, equal to the number 360 divided by the product of (P×N).

9. The motor of claim 4 wherein the motor has P poles and wherein there are N magnetically responsive sensors, and wherein the predetermined angular extent of the shaft that is surrounded by the radially inward end of the spoke is, in degrees, equal to the number 360 divided by the product of (P×N).

10. The motor of claim 1 wherein the motor has P poles and wherein there are N magnetically responsive sensors, and wherein the predetermined angular extent of the shaft that is surrounded by the radially inward end of the spoke is, in degrees, equal to the number 360 divided by the product of (P×N).

11. The motor of claim 1 wherein support substrate has a lower surface thereon, and wherein the motor has field windings mounted within the motor housing, the windings having end turns thereon, the motor further comprising:

a disc of magnetic material disposed intermediate the lower surface of the substrate and the end turns of the windings.

12. The motor of claim 1 further comprising:

a disc of magnetic material mounted in a fixed relationship with respect to the axis of the shaft and in a plane perpendicular thereto, the disc of magnetic material being disposed intermediate the first surface of the support substrate and the end turns projecting past the first axial end of the stator.

* * * * *